(12) United States Patent
Kato

(10) Patent No.: US 7,274,499 B2
(45) Date of Patent: Sep. 25, 2007

(54) SCANNING OPTICAL APPARATUS AND IMAGE FORMING APPARATUS USING THE SAME

(75) Inventor: Manabu Kato, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 507 days.

(21) Appl. No.: 10/808,442

(22) Filed: Mar. 25, 2004

(65) Prior Publication Data

US 2005/0057642 A1 Mar. 17, 2005

(30) Foreign Application Priority Data

Sep. 17, 2003 (JP) .............................. 2003-324641

(51) Int. Cl.
*G02B 26/08* (2006.01)
*B41J 27/00* (2006.01)
(52) U.S. Cl. ..................... 359/216; 359/204; 359/205; 347/259; 347/243
(58) Field of Classification Search .................... None
See application file for complete search history.

(56) References Cited

U.S. PATENT DOCUMENTS

| 5,646,767 | A | | 7/1997 | Iima et al. ................... 359/206 |
| 5,946,126 | A | * | 8/1999 | Takeuchi ..................... 359/216 |
| 6,381,057 | B1 | * | 4/2002 | Itabashi ....................... 359/204 |
| 2002/0018273 | A1 | * | 2/2002 | Iizuka .......................... 359/198 |

FOREIGN PATENT DOCUMENTS

| JP | 10-148781 | 6/1998 |
| JP | 2001-305459 | 10/2001 |
| JP | 3365869 | 1/2003 |

* cited by examiner

*Primary Examiner*—James Phan
(74) *Attorney, Agent, or Firm*—Fitzpatrick, Cella, Harper & Scinto

(57) ABSTRACT

An object of the present invention is to prevent deterioration of image quality caused by ghost light generated from components of a scanning optical apparatus. In the present invention, an image writing light flux is related with a position at which ghost light appears and the exposure amount of the ghost light and a ghost light exposure amount on a surface to be scanned is calculated on comparison with an actual image signal, and the light quantity or the pulse width of a light flux emitted from a light source is controlled based on the calculated ghost light exposure amount.

21 Claims, 9 Drawing Sheets

SCANNING OPTICAL APPARATUS AND IMAGE FORMING APPARATUS USING THE SAME

BACKGROUND OF THE INVENTION

1. Field of the Invention

The present invention relates to a scanning optical apparatus, and particularly to an scanning optical apparatus suitable for an apparatus, such as a laser beam printer using an electrophotography process or a digital copying machine, in which a light flux emitted form light source means is deflected by a deflecting element to scan a surface to be scanned with light via an imaging element having fθ characteristics so as to record image information. The present invention also relates to an image forming apparatus using such a scanning optical apparatus.

2. Related Background Art

In conventional scanning optical apparatuses such as a laser beam printer (LBP), a light flux emitted from light source means is optically modulated in accordance with an image signal. The light flux thus optically modulated is periodically deflected by a light deflecting device composed of a polygon mirror and focused by an imaging optical system having fθ characteristics onto a surface of a photosensitive substrate as a spot, so that image recording is carried out by optical scanning.

FIG. 11 schematically shows a conventional scanning optical apparatus (see Japanese Patent Application Laid-Open No. H10-148781, Japanese Patent No. 3365869 or Japanese Patent Application Laid-Open No. 2001-305459). In FIG. 11, a diverging light flux emitted form light source means 1 is converted into a substantially parallel light flux by a collimator lens 2 and made incident on a cylindrical lens 4 while regulated by a stop 3. The parallel light flux incident on the cylindrical lens 4 is emitted from it without being changed with respect to the main scanning plane, but focused with respect to the sub scanning plane, so that the light flux is imaged on a reflecting surface of a deflecting element 5 composed of a polygon mirror as a substantially linear image. The light flux reflected and deflected by the surface of the deflecting element 5 is guided to a surface to be scanned 8 via a scanning optical element (an fθ lens) 6 having fθ characteristics. The surface to be scanned 8 is scanned by rotating the deflecting element 5 in the direction indicated by arrow A.

A scanning optical apparatus for use in a color image forming apparatus is provided with a plurality of light source means and light fluxes are made incident on one or multiple deflecting elements. The plurality of incident light fluxes have angles relative to the deflection scanning plane and a plane including an optical axis of the deflecting element and orthogonal to the deflection scanning plane respectively. After passing through the one or plurality of scanning optical elements, the light flux is split by a mirror or the like and a plurality of different surfaces to be scanned are scanned by a plurality of light spots.

Conventionally, in the scanning optical apparatus and the image forming apparatus using the same, there has been a problem that deterioration of image quality such as streaks in an image of doubled images occurs on account of ghost light generated from optical elements or mechanical elements in the scanning optical apparatus.

In recent years particularly, with use of plastic materials for scanning optical elements or cylindrical lenses, lenses without anti-reflection coating have become mainstream, and therefore significant amount of ghost light is generated at lens surfaces. In addition, with downsizing of the scanning optical apparatus, a chassis for supporting optical elements and an optical path have become spatially close to each other. Consequently, ghost light generated at mechanical members such as a chassis, a stop or a non-mirror portion of a deflecting element has been increasing.

A so-called tandem type color image forming apparatus has four photosensitive members in which light scanning apparatuses are provided for the respective photosensitive members so that latent images are formed by laser light and images of respective colors of Y (yellow), M (magenta), C (cyan) and Bk (black) corresponding to an original are formed on the respective photosensitive members. The tandem type color image forming apparatus is equipped with a scanning optical system that scans light fluxes in the opposite directions by a common deflecting device, and it suffers from a problem that generated ghost light can be incident on the opposite surface to be scanned to cause streaks in images or misregistration of colors.

As measures for reducing such ghost light, there has been known:

(1) blocking the ghost light with a mechanical member (disclosed in Japanese Patent Application Laid-Open No. H10-148781);

(2) separating the ghost light utilizing eccentricity of an optical element (disclosed in Japanese Patent No. 3365869); or (3) guiding the ghost light outside the effective image area (disclosed in Japanese Patent Application Laid-Open No. 2001-305459) However, (1) in the case that the ghost light is blocked by a mechanical member, requirement for precision in position of the mechanical member is strict and there is a risk that an image writing light flux is also blocked in some cases, (2) in the case that the ghost light is separated by eccentricity of an optical element, aberrations of the optical system are deteriorated by the eccentricity and curvature of scanning line and rotation in the spot shape are caused, and (3) the optical design in which the ghost light is guided outside the effective image will reduce freedom in design and the structure will be complicated. In addition, with any one of the above measures, there remains ghost light that cannot be eliminated completely depending on the shape of optical elements, for example, ghost light generated by internal reflection.

SUMMARY OF THE INVENTION

The present invention is intended to overcome or reduce the above-described problems. According to the present invention, a position at which ghost light is generated and its exposure amount are calculated based on an image signal with which printing is actually carried out and the light quantity and/or pulse width of an image writing light flux is controlled thereby correcting influence of ghost light electrically. With this feature, illumination distribution on the image plane on a surface to be scanned is made uniform. Thus, the present invention provides a scanning optical apparatus suitable for highly fine printing and an image forming apparatus using such a scanning optical apparatus.

According to the present invention, there is provided a scanning optical apparatus in which an image writing light flux that is modulated by an image signal, emitted from light source means is deflected by deflecting means to scan a surface to be scanned via imaging means, comprising:

ghost exposure amount calculation means for calculating a position on the surface to be scanned at which ghost light from a component of the scanning optical apparatus disposed in an optical path through which a light flux emitted from the light source means passes appears and an exposure amount thereof, based on precedently stored relationship of the position at which ghost light appears and the exposure amount thereof to the light flux emitted from the light source and on the image signal;

exposure amount control means for controlling an emitted light amount of the light flux emitted from the light source means or a pulse width of the light flux emitted from the light source means based on a result of the calculation.

In the scanning optical apparatus according to the present invention, the ghost light may include light that is generated by internal surface reflection of a scanning optical element included in the imaging means and arrives at the surface to be scanned.

In the scanning optical apparatus according to the present invention, the ghost light may include light that is reflected from a surface of a scanning optical element included in the imaging means and incident on the deflecting means again and arrives at the surface to be scanned.

In the scanning optical apparatus according to the present invention, the ghost light may include light that comes from a surface of a chassis supporting scanning optical elements included in the deflecting means and the imaging means and arrives at the surface to be scanned.

In the scanning optical apparatus according to the present invention, the precedently stored relationship of the position at which ghost light appears and the exposure amount to the light flux emitted from the light source may be related to a main scanning direction.

In the scanning optical apparatus according to the present invention, the precedently stored relationship of the position at which ghost light appears and the exposure amount to the light flux emitted from the light source may be related to a main scanning direction and a sub scanning direction.

In the scanning optical system according to the present invention, a scanning optical element included in the imaging means may be a plastic lens.

In the scanning optical apparatus according to the present invention, the light source means may be a multi-beam light source that emits a plurality of light fluxes that are modulated independently.

According to a second aspect of the present invention, there is provided a scanning optical apparatus in which a plurality of image writing light fluxes that are modulated by different image signals, emitted from plurality of light source means are deflected by deflecting means to opposite directions to scan a plurality of surfaces to be scanned via plurality of imaging means, comprising:

ghost exposure amount calculation means for calculating a position on the surface to be scanned at which ghost light from a component of the scanning optical apparatus disposed in an optical path through which a light flux emitted from the light source means passes appears and an exposure amount thereof, based on precedently stored relationship of the position at which ghost light appears and the exposure amount thereof to the light flux emitted from the light source and on the image signal;

exposure amount control means for controlling an emitted light amount of the light flux emitted from the light source means or a pulse width of the light flux emitted from the light source means based on a result of the calculation.

In the scanning optical apparatus according to the second aspect of the present invention, the ghost light may include light that is generated by internal surface reflection of a scanning optical element included in the imaging means and arrives at the surface to be scanned.

In the scanning optical apparatus according to the second aspect of the present invention, the ghost light may include light that is reflected from a surface of a scanning optical element included in the imaging means and incident on the deflecting means again and arrives at the surface to be scanned.

In the scanning optical apparatus according to the second aspect of the present invention, the ghost light may include light that comes from a surface of a chassis supporting scanning optical elements included in the deflecting means and the imaging means and arrives at the surface to be scanned.

In the scanning optical apparatus according to the second aspect of the present invention, the precedently stored relationship of the position at which ghost light appears and the exposure amount to the light flux emitted from the light source may be related to a main scanning direction.

In the scanning optical apparatus according to the second aspect of the present invention, the precedently stored relation of the position at which ghost light appears and the exposure amount to the light flux emitted from the light source may be related to a main scanning direction and a sub scanning direction.

In the scanning optical system according to the second aspect of the present invention, a scanning optical element included in the imaging means may be a plastic lens.

In the scanning optical apparatus according to the second aspect of the present invention, the light source means may be a multi-beam light source that emits a plurality of light fluxes that are modulated independently.

In the scanning optical apparatus according to the second aspect of the present invention, the ghost light may include light reflected from a surface of a scanning optical element included in the imaging means and arriving at an opposite surface to be scanned.

According to the present invention, there is also provided an image forming apparatus comprising:

a scanning optical apparatus according to the present invention;

a photosensitive member disposed at the surface to be scanned;

a developing device for developing an electrostatic latent image formed on the photosensitive member by a light flux scanned by the scanning optical apparatus as a toner image;

a transferring device for transferring the developed toner image onto a transfer destination material; and a fixing device for fixing the transferred toner image on the transfer destination material.

According to the present invention, there is also provided a color image forming apparatus comprising:

a scanning optical apparatus according to the second aspect of the present invention;

a plurality of photosensitive members disposed at the plurality of surfaces to be scanned;

a plurality of developing devices for developing electrostatic latent images formed on the photosensitive members by light fluxes scanned by the scanning optical apparatus as toner images;

a transferring device for transferring the developed toner images onto a transfer destination material; and a fixing device for fixing the transferred toner image on the transfer destination material.

According to the present invention, there is also provided an image forming apparatus comprising:

a scanning optical apparatus according to the present invention; and a printer controller that converts code data input from an external device into an image signal and input it to the scanning optical system.

According to the present invention, there is provided a color image forming apparatus comprising:

a scanning optical apparatus according to the second aspect of the present invention; and a printer controller that converts code data input from an external device into an image signal and input it to the scanning optical system.

As per the above, in the present invention, a position at which ghost light appears and the exposure amount thereof are calculated based on an image signal of the scanning optical apparatus, and influence of the ghost light is electrically corrected by controlling the emitted light quantity and/or the pulse width of an image writing light flux.

Other objects and features of the present invention will become apparent by the following description that will be made with reference to the accompanying drawings.

DESCRIPTION OF THE PREFERRED EMBODIMENTS

Figure 1:
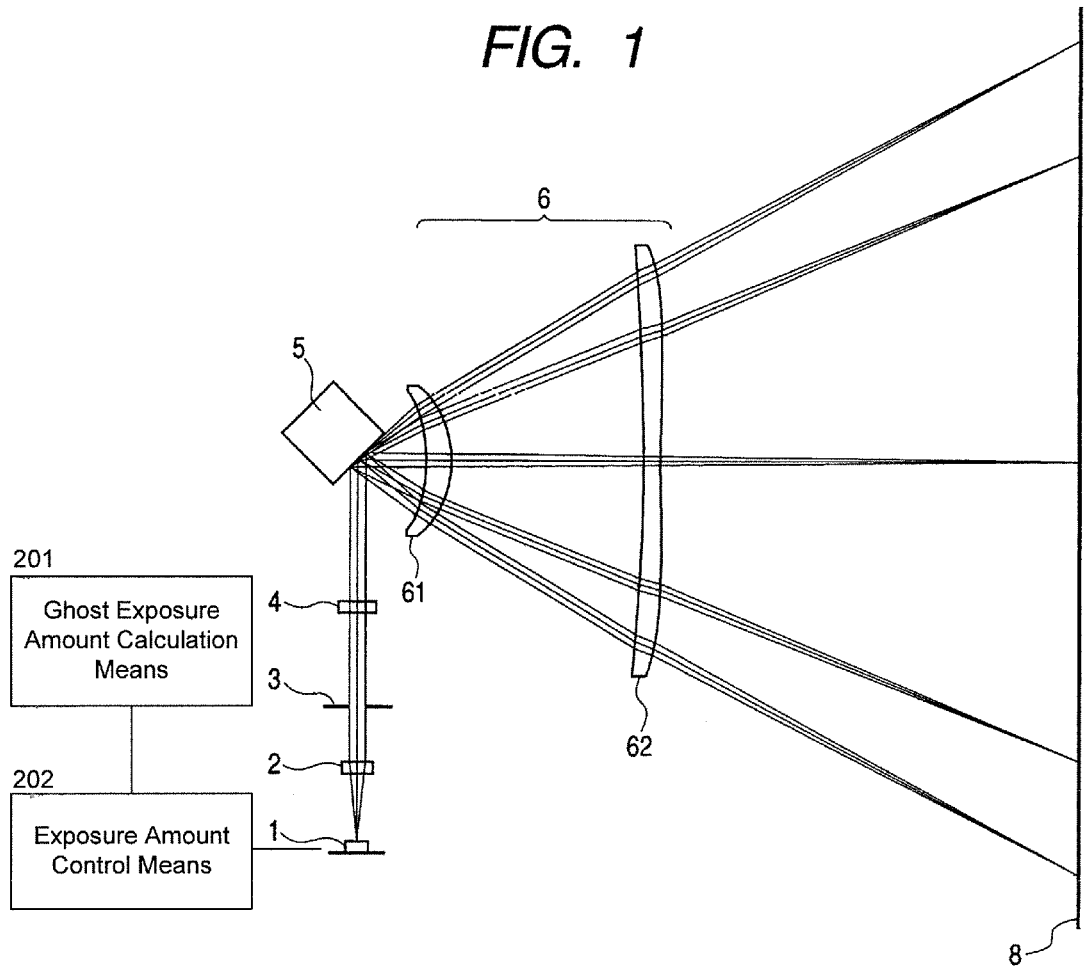
FIG. 1 is a cross sectional view in the main scanning direction of a scanning optical apparatus according to a first embodiment.
Figure 2:
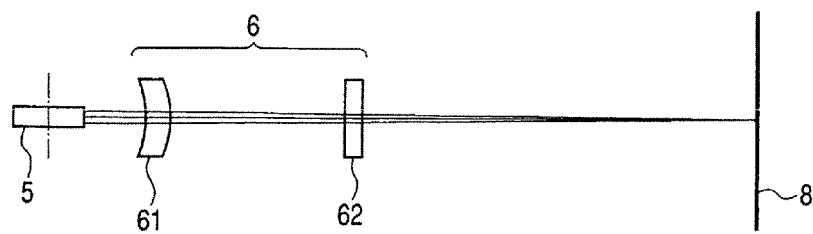
FIG. 2 is a cross sectional view in the sub scanning direction of the scanning optical apparatus according to the first embodiment.

FIG. 1 is a cross sectional view in the main scanning direction of a scanning optical system according to a first embodiment of the present invention.

In FIG. 1, reference numeral 1 designates light source means composed, for example, of a semiconductor laser, reference numeral 2 designates a collimator lens, reference numeral 3 designates a stop for regulating a light flux (or light quantity), and reference numeral 4 designates a cylindrical lens.

Reference numeral 5 designates a deflecting element composed of a polygon mirror, which is rotated in the direction indicated by an arrow by driving means such as a motor. Reference numeral 6 designates a scanning optical system having fθ characteristics. In this embodiment, the scanning optical system 6 is composed of scanning optical elements in the form of two plastic lenses 61 and 62. Reference numeral 8 designates a photosensitive drum as a surface to be scanned.

A divergent light flux emitted from a semiconductor laser 1 serving as the light source means is converted into a substantially parallel light flux by the collimator lens 2. The light flux is regulated by the stop 3 in its light quantity and made incident on the cylindrical lens 4. The light flux is then made incident on the polygon mirror 5 serving as a deflecting element without modification with respect to the main scanning direction, but focused by the cylindrical lens 4 with respect to the sub scanning direction in the vicinity of the surface of the polygon mirror 5. Consequently, the light flux incident on the polygon mirror 5 becomes a linear image with the longitudinal direction being oriented in the main scanning direction.

The light flux is made incident on the polygon mirror 5 with angles relative to the deflection scanning plane and a plane including the rotation axis of the deflecting element and orthogonal to the deflection scanning plane respectively and deflected and scanned toward the scanning optical system with rotation of the polygon mirror in the direction indicated by an arrow by the motor so as to be incident on the scanning optical system 6 having fθ characteristics. The scanning optical system 6 is composed of two plastic toric lenses 61 and 62 having different refractive indices in the main scanning direction and the sub scanning direction. The scanning optical system 6 focuses the deflected light flux coming from the polygon mirror 5 onto the surface to be scanned 8 and corrects the inclination of the polygon mirror surface. The light flux incident on the scanning optical system 6 is focused by the scanning optical system onto the surface to be scanned 8, thereby optically scanning the surface to be scanned 8 in the form of a photosensitive drum with the light flux.

Here, ghost light in the scanning optical system will be described. The aforementioned toric lenses 61 and 62 made of plastic does not have anti-reflection coating on their surface. That is because deposition of an anti-reflection film on plastic lenses is difficult and costly. Therefore, about 4% of the light flux is reflected at a lens surface, though the percentage will vary depending on the incidence angle and the direction of deflection of the light flux.

Figure 3:
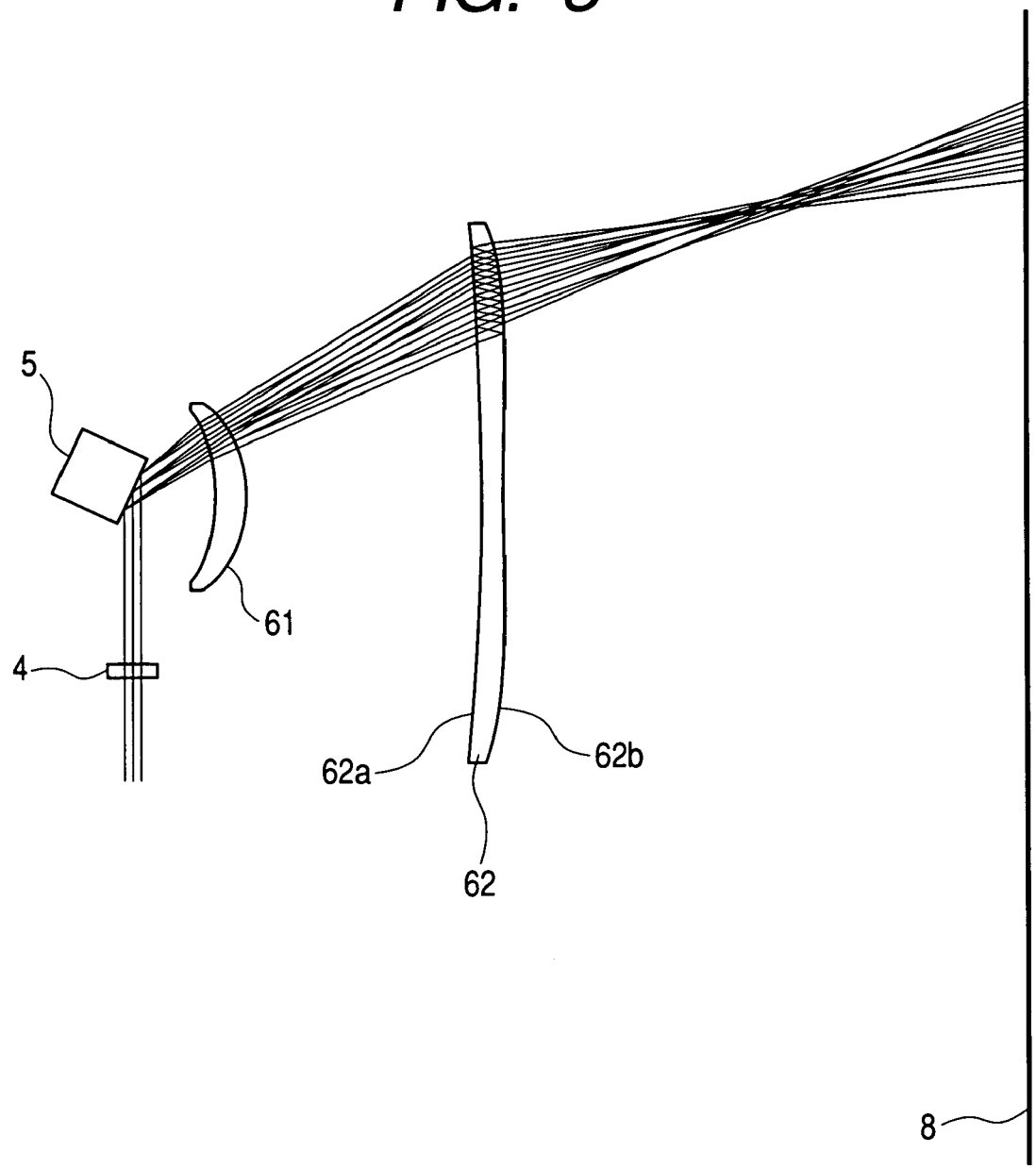
FIG. 3 schematically shows ghost light generated by internal surface reflection of a toric lens in the first embodiment.
Figure 4:
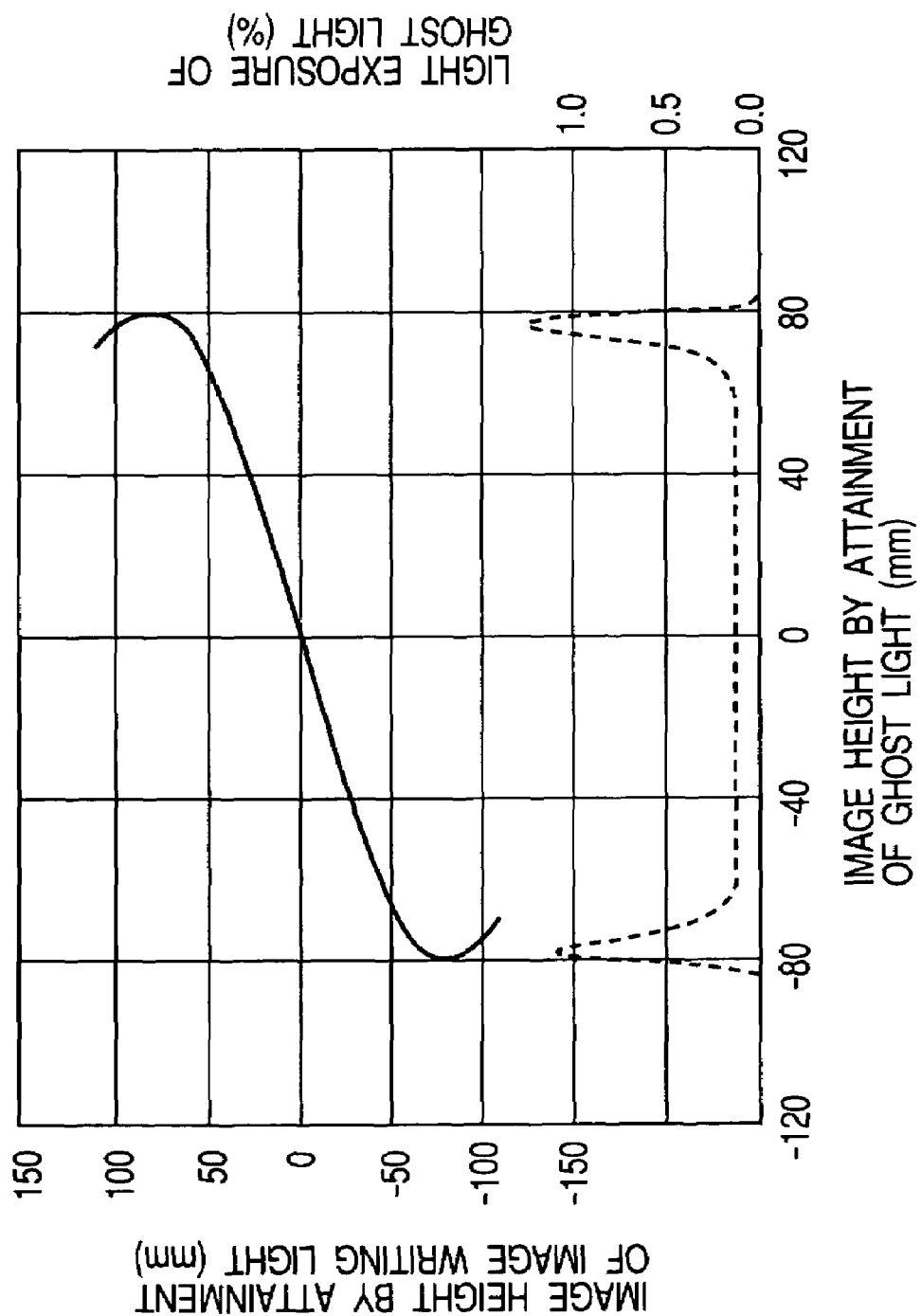
FIG. 4 is a graph showing positions at which ghost light appears and its exposure amount in relation to an image writing light flux in the first embodiment.

FIG. 3 shows internal surface reflection of the toric lens 62 (G2 lens) on the side of the surface to be scanned 8 in the scanning optical apparatus according to the present invention. FIG. 4 is a graph showing the position at which ghost light appears and light exposure amount of the ghost light in relation to the image writing light flux, where the vertical axis represents the image height at which the image writing light flux arrives and the horizontal axis represents the image height at which the ghost light corresponding to the writing light flux arrives. The solid line in FIG. 4 represents the position at which the principal ray of the ghost light arrives and the broken line in FIG. 4 represents the amount obtained by integrating the ghost light and converting the result into exposure amount, and therefore the vertical axis represents the exposure amount of the ghost light.

Since the ghost light generated by internal surface reflection of the plastic toric lens 62 as a scanning optical element is reflected twice, that is, at the emergence surface 62b and the incidence surface 62a, the light quantity is approximately as small as 4%×4%=0.16%.

However, behavior of the actual ghost light is complicated. For example, in this embodiment, as will be seen from the solid line in FIG. 4, the ghost light stops and changes the direction at a position near the image height Y=±80 mm. Therefore, the scanning speed of the ghost light in the vicinity of the aforementioned image height is sufficiently slow as compared to the image writing light flux, and the light exposure amount of ghost light (shown by the broken line) that reflects the scanning speed is as large as 1.2%.

Figure 5A:
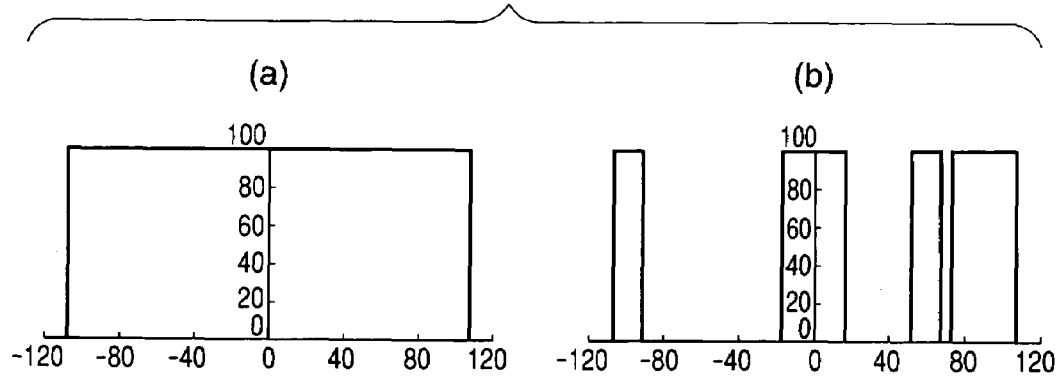
FIGS. 5A, 5B and 5C are graphs for illustrating relationship of the ghost exposure amount and the emission light quantity of a light sources where graphs (a) are directed to a solid black image and diagrams (b) are directed to a typical image.
Figure 5B:
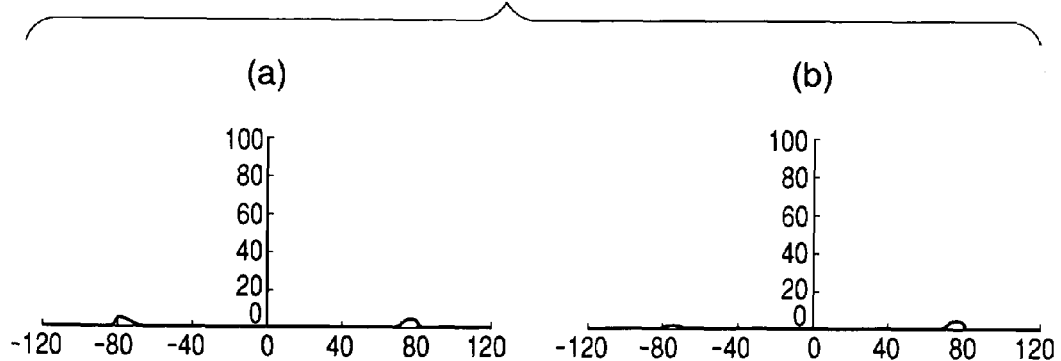
Figure 5C:
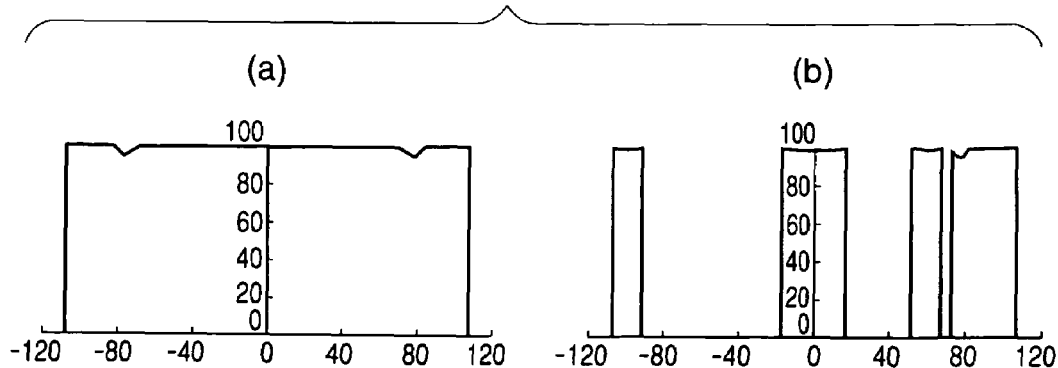

In this embodiment, the light quantity of the image writing light flux is controlled so that image surface illuminance at the surface to be scanned is made uniform in spite of such ghost light. This control method will be described with reference to a 100%-printed image (i.e. a solid black image) and a typical image. In FIGS. 5A to 5C, graphs (a) are directed to light quantity control in the case of a solid black image and graphs (b) are directed to light quantity control in the case of a typical image. FIG. 5A shows actual image signals (ON/OFF) to be recorded. Conventionally, the light source is caused to emit light with a constant light quantity in accordance with the image signal. In this embodiment, however, the light quantity of the light source is controlled in accordance with the following control process.

(Calculation of the Exposure Amount of Ghost Light)

The ghost exposure amount calculation means 201 shown in FIG. 1 is a means in which precedently stored relationship of the position at which ghost light appears and the exposure amount relative to the image writing light flux (shown in FIG. 4) and an actual image signal are compared and conversion into position and exposure amount is carried out so that the appearing position and exposure amount of ghost light are estimated. FIG. 5B shows the respective results of the ghost exposure amount calculation. In connection with internal surface reflection in the toric lens 62 of this embodiment, when recording is carried out in the vicinity of the outermost off-axis image height position, ghost light appears at the image heights of Y=±80 mm. In graph (a), the ghost exposure amount is symmetrical, since the image is a solid black image. On the other hand, it will be seen from graph (b) that the ghost light in the plus image height side in which the printing proportion near the outermost off-axis image height is high is larger than the ghost light in the minus image height side.

(Control of Light Emitted from the Light Source Means 1)

A ghost exposure amount is subtracted from the light quantity before correction of the light flux emitted from the light source means 1, and the result is set as the light quantity after correction of the light flux emitted from the light source 1. When the subtraction result is a negative value, the emitted light quantity is set to zero. The exposure amount control means 202 shown in FIG. 1 controls the pulse width of the light emitted from a light source so as light quantity of the emitted light beam to be the calculated light quantity. FIG. 5C shows the light quantity of the light flux emitted from the light source means 1 after correction for the respective images. In the case of this embodiment, it will be seen that the light quantity of the emitted light is reduced at image height Y=+80 mm by an amount corresponding to the ghost light.

In other words, the emitted light quantity of a regular image writing light flux in the area in which the exposure amount of ghost light is large is made smaller than the emitted light quantity of a regular image writing light flux in the area in which the exposure amount of the ghost light is small.

For example, in the case that the same image signal is to be printed at the image height Y=0 mm and the image height +80 mm, the emitted light quantity of the regular image writing light flux should be the same at the image height Y=0 mm and the image height Y=+80 mm. However, in this embodiment, the emitted light quantity of the regular image writing light flux at the image height Y=+80 mm is made smaller than the emitted light quantity of the regular image writing light flux at the image height Y=0 mm.

In the present invention, the area in which the exposure amount of ghost light is large is the area in which a problem of deterioration of image quality due to non-uniformity in image surface illuminance arises. That is the area in which the exposure amount of ghost light is equal to or larger than 0.5% of the exposure amount of a regular solid black image writing light flux.

In the scanning optical apparatus according to this embodiment, the peak (i.e. the maximum value) of the ghost exposure amount appears in the image height area of 70 to 90% that includes the image height Y=+80, and deterioration of image quality due to non-uniformity in the image surface illuminance greatly matters in the image height area of 70 to 90%. Consequently, the feature of this embodiment is required.

Although this embodiment has been described with reference to the internal surface reflection of the toric lens 62 disposed on the side of the surface to be scanned, similar control can be performed on ghost light generated from an optical element such as a turn-back mirror (not shown) or a mechanical member for supporting an optical element, ghost light generated from a reflection surface of the deflecting means 5, ghost light generated from a mechanical member such as a chassis (an optical chassis), a stop 3 or a non-mirror portion of the deflecting means 5, ghost light generated from a mechanical member such as a side wall of the scanning optical apparatus or the photosensitive drum 8, and all other ghost light.

Furthermore, in the present invention, the cause of ghost light is not only flare reflection of the image writing flux but also flare reflection of a synchronization detection light flux (or a BD light flux), which will be described later.

The position at which ghost light is generated includes a synchronization detection optical system (not shown) for aligning the writing start position of image writing light flux arriving at the surface to be scanned. Ghost light is generated when the synchronization detection light flux (BD flux) is reflected by a chassis of the scanning optical apparatus, a light receiving surface of a synchronization detection element or other supporting elements upon synchronization detection.

Although in the above description, relationship of the position at which ghost light appears and the exposure amount have been related with the image writing light flux with respect only to one scanning line (i.e. the main scanning direction), there are considerable ghost light that extend in the sub scanning direction. With respect to such ghost light, highly accurate electrical correction of ghost light can be made possible by relating image writing light flux with the position at which ghost light appears and the exposure value two dimensionally (i.e. in both the main scanning direction and the sub scanning direction).

Figure 9:
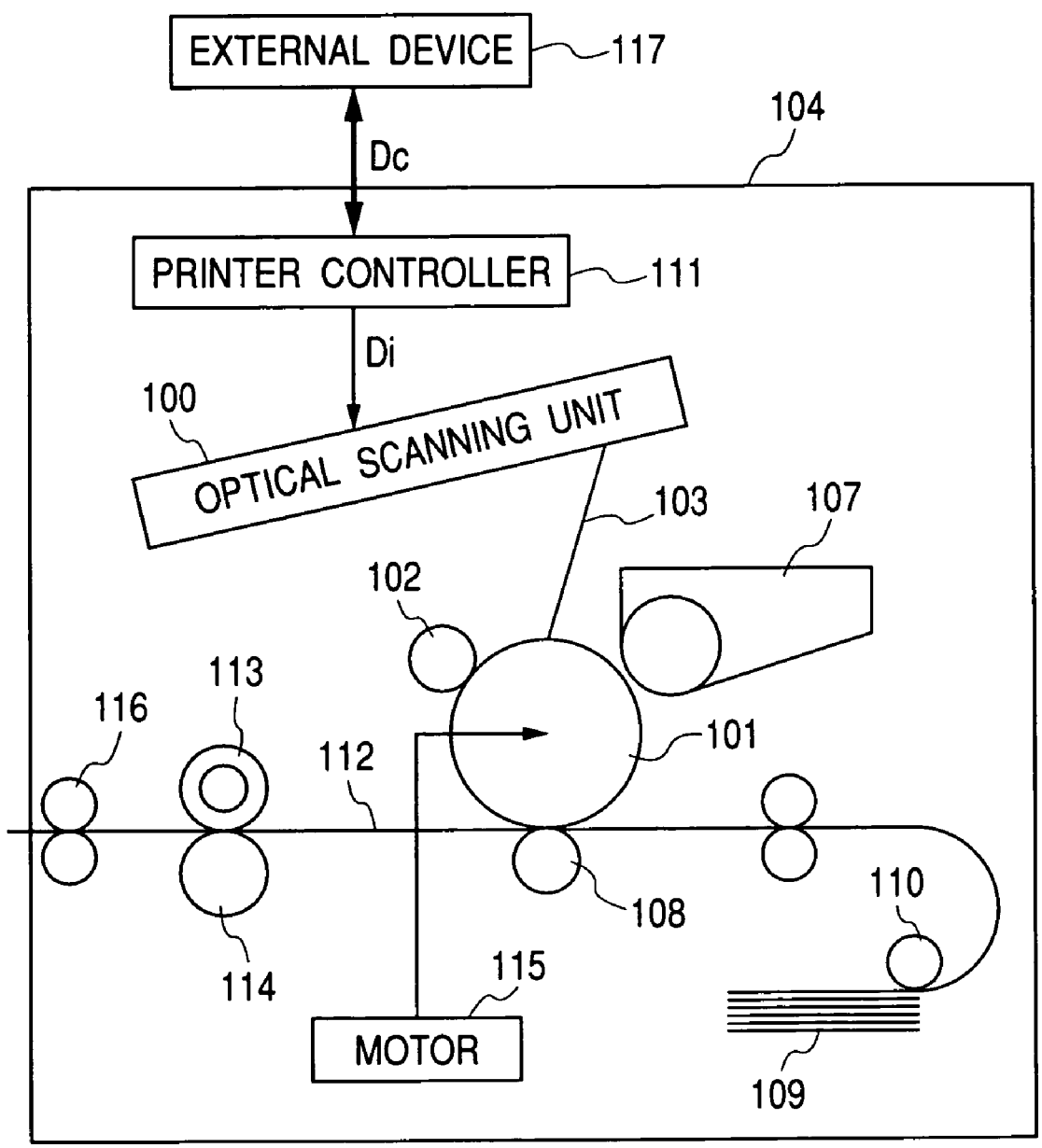
FIG. 9 shows an image forming apparatus according to the first embodiment.

FIG. 9 is a cross sectional view in the sub scanning direction showing an embodiment of an image forming apparatus according to the present invention. In FIG. 9, reference numeral 104 designates an image forming apparatus. Code data Dc is input to the image forming apparatus 104 from an eternal device 117 such as a computer. The code data Dc is converted into image data (dot data) Di by a printer controller 111 provided in the apparatus. The image data Di is input to the scanning optical apparatus 100 having the structure described as the embodiment. From the scanning optical apparatus 100, a light beam 103 that has been modulated in accordance with the image data Di is emitted. A photosensitive surface of a photosensitive drum 101 is scanned by this light beam 103 in the main scanning direction.

The photosensitive drum 101 serving as an electrostatic latent image bearing member (or a photosensitive member) is rotated clockwise by a motor 115. With the rotation, the photosensitive surface of the photosensitive drum 101 moves relative to the light beam 103 in the sub scanning direction perpendicular to the main scanning direction. Above the photosensitive drum 101, there is provided a charging roller 102 for uniformly charging the surface of the photosensitive drum 101 in such a way as to be in contact with the surface of the photosensitive drum 102. The surface of the photosensitive drum 101 having been charged by the charging roller 102 is irradiated with light beam 103 scanned by the aforementioned scanning optical apparatus 100.

As described before, the light beam 103 has been modulated based on the image data Di, and an electrostatic latent image is formed on the surface of the photosensitive drum with irradiation with the light beam 103. The electrostatic latent image is developed as a toner image by a developing device 107 that is disposed downstream of the irradiation position of the light beam 103 with respect to the rotation direction of the photosensitive drum 101 in such a way as to be in contact with the photosensitive drum.

Below the photosensitive drum 101, the toner image developed by the developing device 107 is transferred onto a paper sheet 112 serving as a transfer destination material by a transferring roller 108 that is disposed in such a way as to be opposed to the photosensitive drum 101. The paper sheet 112 is stored in a sheet cassette 109 on the front side the photosensitive drum 101. The sheet may also be fed manually. Near the edge of the sheet cassette 109, there is provided a sheet feeding roller 110 to feed a sheet 112 stored in the sheet cassette 109 to the conveying path.

As per the above, the paper sheet 112 on which an unfixed toner image has been transferred is further conveyed to a fixing device disposed on the rear side (on the left side in FIG. 9) of the photosensitive drum 101. The fixing device is composed of a fixing roller 113 having a fixing heater (not shown) in the interior thereof and a pressurizing roller 114 disposed in pressure contact with the fixing roller 113. The fixing device heats the paper sheet 112 while pressurizing it in the pressurizing portion between the fixing roller 113 and the pressurizing roller 114 to fix the unfixed toner image on the paper sheet 112. On the rear side of the fixing roller 113, there is further provided a sheet discharge roller 116 to discharge the fixed sheet to the exterior of the image forming apparatus.

A printer controller 111 performs not only the aforementioned data conversion but also control of various portions in the image forming apparatus such as a motor 115 and a polygon motor etc. provided in the scanning optical apparatus, though not shown in the drawing.

As per the above, in this embodiment, image writing light flux is related with the position at which ghost light is generated and the exposure amount and ghost light exposure amount on the surface to be scanned is calculated based on comparison with an actual image signal, so that emitted light quantity of the light source is controlled based on that. Thus, even if anti-reflection coating is not formed on lens surfaces and ghost light is generated from mechanical members, the image surface illuminance on the surface to be scanned can be made uniform by inexpensive means, and scanning optical apparatus and image forming apparatus suitable for highly fine printing are realized.

The scanning optical system having fθ characteristics is not limited to two lenses. The scanning optical system 6 may be composed of one lens, or more than two lenses. In addition, the scanning optical system 6 may be provided with a diffraction optical element or a curved surface mirror.

The ghost light in question in the present invention also includes ghost light generated at a diffraction optical element, an optical surface of a curved surface mirror or supporting members for them.

Although in FIG. 1, the number of light fluxes guided onto the surface to be scanned 8 after passing through the scanning optical system with rotation of the deflecting means is one, the number of the light fluxes may be two or more.

A semiconductor laser having two or more light emitting portions includes a monolithic multi-semiconductor laser. Alternatively, a synthesized system in which two monolithic single semiconductor lasers each having one light emitting portion are synthesized may also be used.

In the case that three or more light fluxes are guided onto one surface to be scanned 8, a surface-emitting semiconductor laser may be used instead of an end emitting type semiconductor laser.

Second Embodiment

Figure 6:
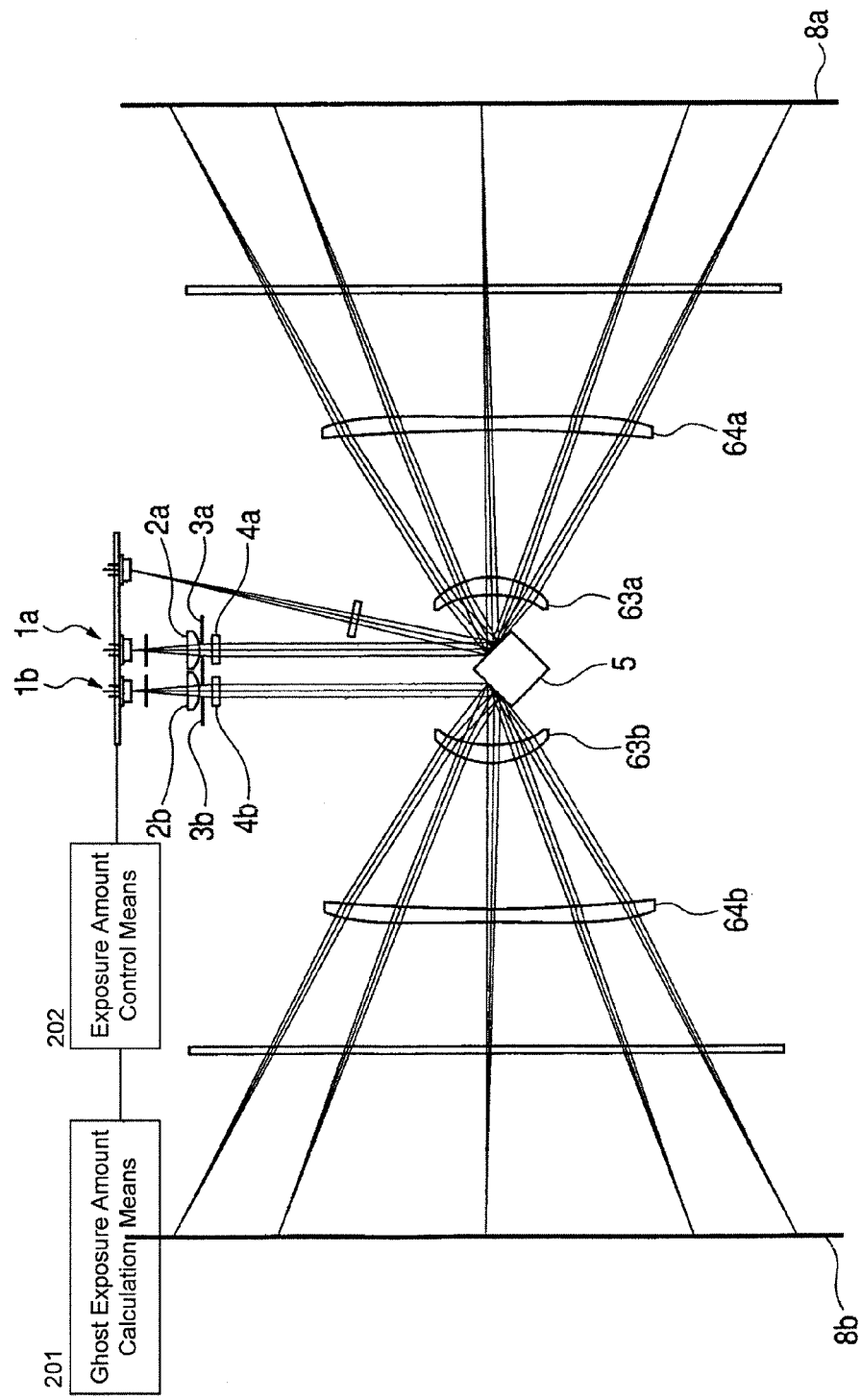
FIG. 6 is a cross sectional view in the main scanning direction of a scanning optical apparatus according to the second embodiment.
Figure 7:
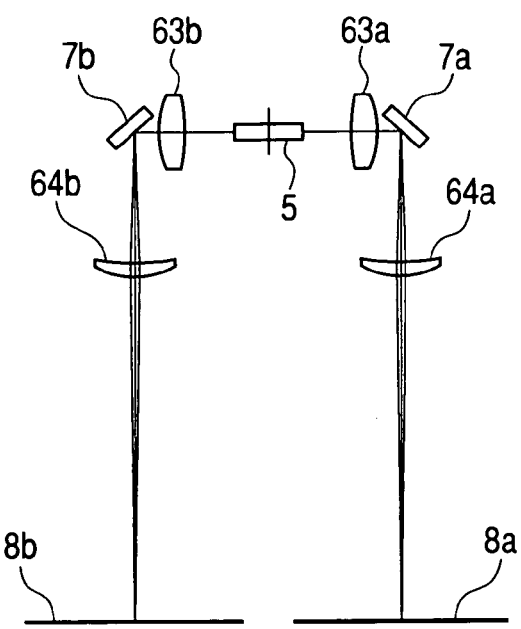
FIG. 7 is a cross sectional view in the sub scanning direction of the scanning optical apparatus according to the second embodiment.
Figure 8:
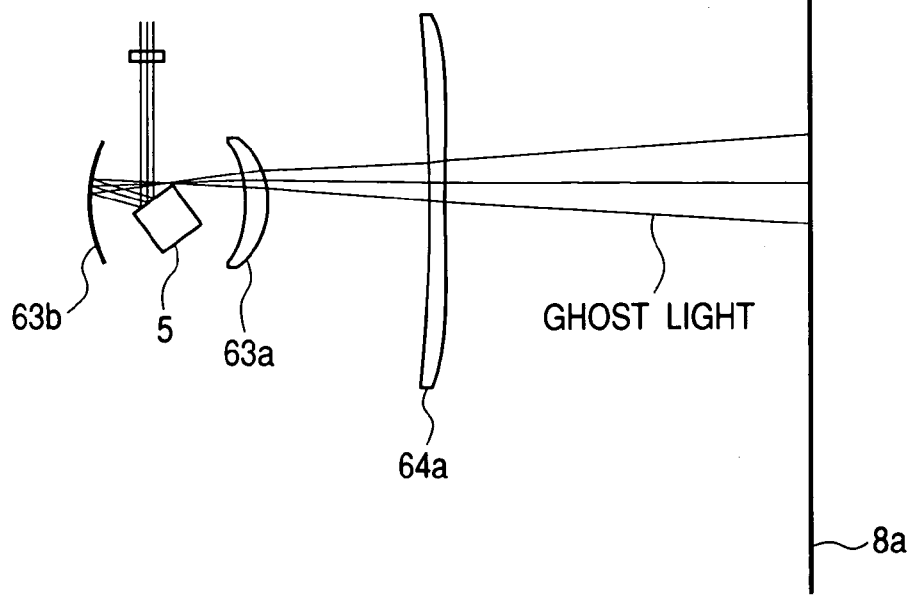
FIG. 8 schematically shows ghost light toward a opposite surface to be scanned in the second embodiment.

FIG. 6 is a cross sectional view in the main scanning direction showing a scanning optical apparatus according to a second embodiment of the present invention. FIG. 7 is a cross sectional view in the sub scanning direction. What is different in the second embodiment from the first embodiment is that the scanning optical apparatus is a tandem type scanning optical apparatus in which a plurality of different surfaces to be scanned are scanned by a plurality of light fluxes simultaneously, that the scanning optical apparatus is equipped in a color image forming apparatus, and that ghost light that travels from an optical element to the opposite surface to be scanned is electrically corrected accordingly. The other features than mentioned above are the same as the first embodiment.

The apparatus according to this embodiment is a scanning optical apparatus provided with two scanning optical systems 6 opposed to each other with a deflecting element 5 between and one more similar unit that is not shown is prepared, so that four light fluxes in all are simultaneously deflected to scan corresponding photosensitive drums with light.

In the case of a scanning optical apparatus like this in which one deflecting element 5 is commonly used for light fluxes directed toward surfaces to be scanned 8a and 8b, there is a problem that light reflected from the surface of an optical element 63b is incident on the opposite surface to be scanned 8a to become ghost light. Such ghost light has been reflected by the surface only once, and the ghost light quantity is approximately as large as 4% (the optical efficiency of the opposite scanning system is not taken into consideration). This light quantity is large as compared to that in the case of internal surface reflection of a lens.

In this embodiment, in order to electrically correct this ghost light, the ghost exposure amount calculation means 201 shown in FIG. 6 estimates the position on the surface to be scanned 8a at which ghost light appears and its exposure amount in accordance with an image signal to be written onto the surface to be scanned 8b by relating the light flux for writing an image on the surface to be scanned 8b with the position on the surface to be scanned 8a at which ghost light appears and its exposure amount.

The ghost light exposure amount calculated before is subtracted from the light quantity of light before correction emitted from the light source means toward the surface to be scanned 8a, and the result is set as the light quantity after correction of the light flux emitted from the light source. With the corrected light quantity of the light flux emitted from the light source, the exposure amount control means 202 shown in FIG. 6 controls the exposure amount of the light source means, with which the surface to be scanned 8 is exposed and scanned.

In other words, the emitted light quantity of a regular image writing light flux in the area in which the exposure amount of ghost light is large is made smaller than the emitted light quantity of a regular image writing light flux in the area in which the exposure amount of the ghost light is small.

In the forgoing, a method for correcting ghost light on the surface to be scanned 8a by the light flux for writing on the surface to be scanned 8b has been described, it is preferable that the ghost light correction be performed vice versa.

Specifically, the correction may be performed in such a way that the emitted light quantity of a regular image writing light flux directed to the area in which ghost light exposure amount is large is not decreased nor increased and the ghost light exposure amount calculated before is added to a regular image writing light flux directed to the area in which ghost light exposure amount is small to set the result as the light quantity after correction of the light flux emitted from the light source, with which the surface to be scanned 8 is exposed and scanned.

In addition, it is also possible to electrically correct ghost light generated via internal surface reflection of lenses or polygon mirror, ghost light generated by mechanical members and ghost light directed to the surface to be scanned corresponding to the writing light flux, as is the case with the first embodiment, by a similar method. In that case, the emitted light quantity after correction of the light source should be calculated based on the image signals of light fluxes directed to two opposite surfaces to be scanned.

Figure 10:
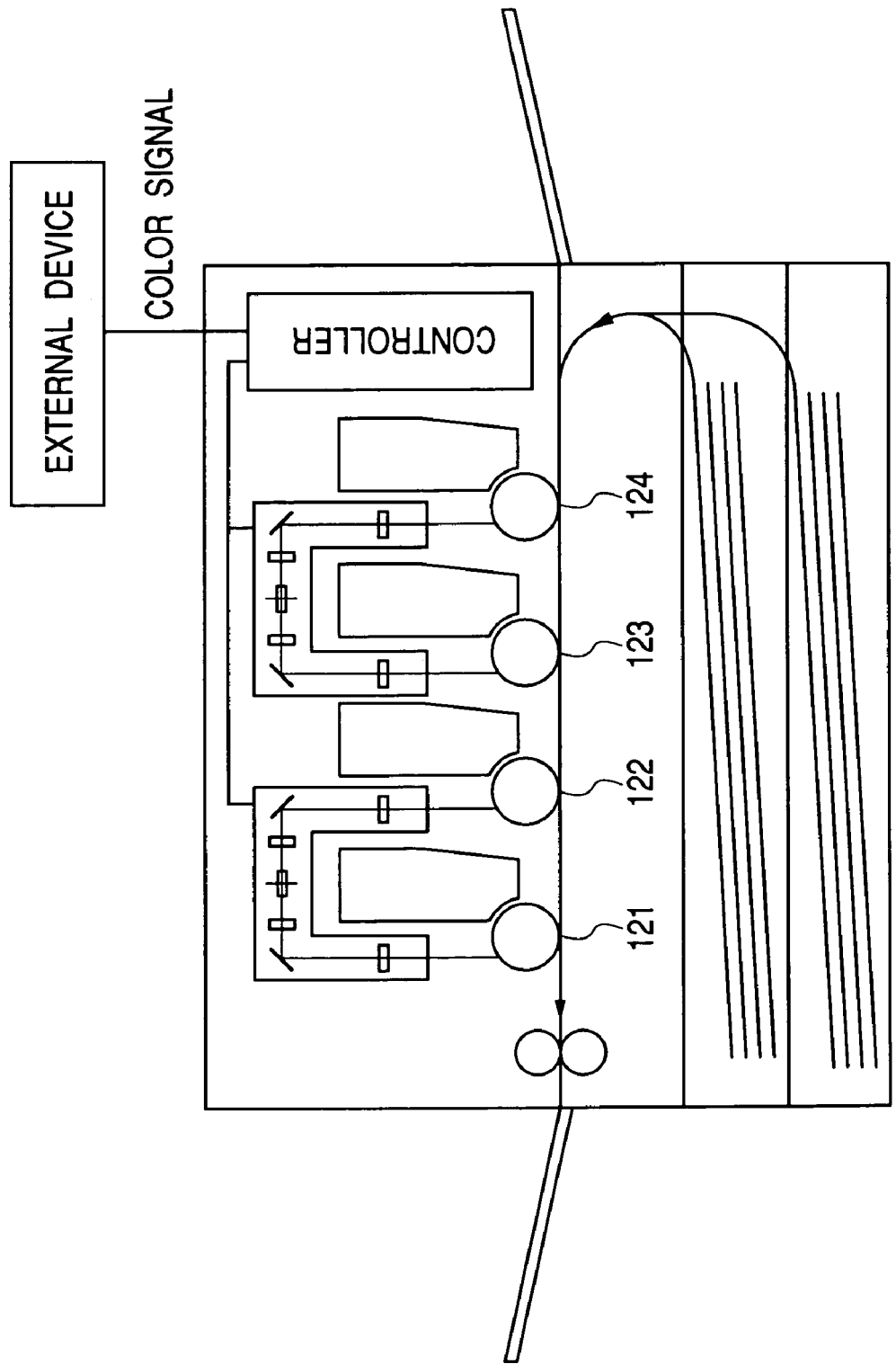
FIG. 10 shows a tandem type color image forming apparatus according to the second embodiment.
Figure 11:
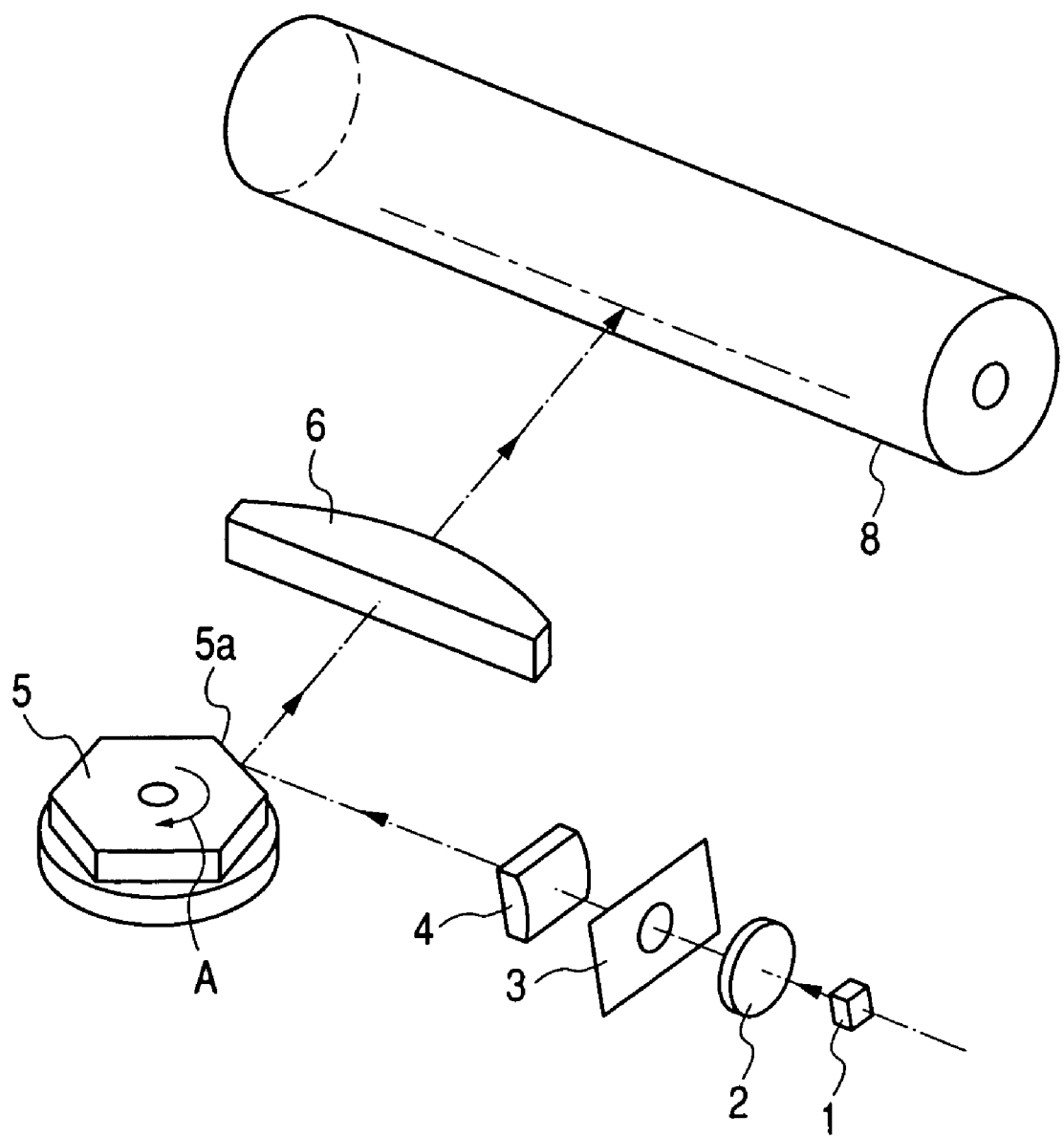
FIG. 11 schematically shows a conventional scanning optical apparatus.

FIG. 10 is a diagram schematically showing a color image forming apparatus according to an embodiment of the present invention. The apparatus of this embodiment is a tandem type color image forming apparatus in which four optical scanning apparatuses are provided to record image information on photosensitive drums as image bearing members. In FIG. 10, reference numeral 60 designates a color image forming apparatus, reference numerals 11, 12, 13 and 14 designate optical scanning apparatuses having a structure according to the first to third embodiments, reference numerals 21, 22, 23 and 24 designate photosensitive drums as image bearing members, reference numerals 31, 32, 33 and 34 designate developing devices and reference numeral 51 designates a conveyer belt.

In FIG. 10, color signals of R (red), G (green) and B (blue) are input to the color image forming apparatus 60 from an external device 52 such as a personal computer. These color signals are converted into image data (dot data) of C (cyan), M (magenta), Y (yellow), B (black) by a printer controller 53 provided in the apparatus. These image data are input to the optical scanning apparatuses 11, 12, 13 and 14 respectively. Light beams 41, 42, 43 and 44 that are modulated in accordance with the respective image data are emitted from the optical scanning apparatuses 11, 12, 13 and 14 so that the photosensitive surfaces of the photosensitive drums 21, 22, 23 and 24 are scanned with these light beams in the main scanning direction.

The color image forming apparatus of this embodiment is provided with four optical scanning apparatus (11, 12, 13, 14) in tandem, which correspond to respective colors of C (cyan), M (magenta), Y (yellow) and B (black) so that image signals (image information) are recorded on the surface of the photosensitive drums 21, 22, 23, 24 in parallel to print a color image.

As per the above, the color image forming apparatus of this embodiment forms latent images of respective colors on the surface of the corresponding photosensitive drums 21, 22, 23 and 24 with light beams corresponding to the respective image data by means of the four optical scanning apparatuses 11, 12, 13 and 14. After that, images are transferred onto a recording material in a superposed manner to form a single full color image.

The aforementioned external device 52 may be a color image reading apparatus equipped with a CCD sensor. In that case, the color image reading apparatus and the color image forming apparatus 60 can constitute a color digital copying machine.

In this embodiment as per the above, in a tandem type scanning optical apparatus in which different surfaces to be scanned are scanned by a plurality of light fluxes simultaneously, a light flux for writing an image on the opposite surface to be scanned is related with the position at which ghost light appears and the exposure amount, a ghost light exposure amount generated in the opposite surface side is calculated by comparison with an actual image signal, and the emitted light amount of the light source is controlled based on the calculated ghost light exposure amount. In addition, ghost light generated from the portions other than the opposite surface can also be corrected electrically by means similar to the first embodiment.

In this way, even if an anti-reflection film is nor formed on lens surfaces and even ghost is generated from mechanical members, image surface illuminance on the surface to be scanned can be made uniform by inexpensive means, and a tandem type scanning optical apparatus and a tandem type color image forming apparatus suitable for highly fine printing are realized.

Third Embodiment

What is different in the third embodiment from the first embodiment is that the calculated exposure amount by ghost light is corrected by controlling the pulse width of the light source. The other features than mentioned above are the same as the first embodiment.

In this embodiment, the pulse width (i.e. time) of the light emitted from a light source is controlled, instead of the emitted light quantity of the light source, based on the ghost exposure amount calculated in FIG. 5B. More specifically, the pulse width of the emitted light is made short at the position at which ghost appears by an amount corresponding to the ghost exposure amount to make the image surface illuminance on the surface to be scanned uniform.

In other words, the emitted light pulse width (time) of a regular image writing light flux in the area in which the exposure amount of ghost light is large is made smaller than the emitted light pulse width of a regular image writing light flux in the area in which the exposure amount of the ghost light is small.

This method can also be applied to the tandem type scanning optical apparatus and the tandem type image forming apparatus described in the second embodiment.

As per the above, in this embodiment also, even if ghost light is generated as is the case with the first embodiment, the image surface illuminance on the surface to be scanned can be made uniform by inexpensive means, and scanning optical apparatus and image forming apparatus suitable for highly fine printing are realized.

What is claimed is:

1. A scanning optical apparatus in which an image writing light flux that is modulated by an image signal, emitted from light source means is deflected by deflecting means to scan a surface to be scanned via imaging means, comprising:

ghost exposure amount calculation means for calculating a position on the surface to be scanned at which ghost light from a component of the scanning optical apparatus disposed in an optical path through which a light flux emitted from said light source means passes appears and an exposure amount thereof, based on precedently stored relationship of the position at which ghost light appears and the exposure amount thereof to the light flux emitted from said light source and on said image signal;

exposure amount control means for controlling an emitted light amount of the light flux emitted from said light source means or a pulse width of the light flux emitted from said light source means based on a result of said calculation.

2. A scanning optical apparatus according to claim 1, wherein said ghost light includes light that is generated by internal surface reflection of a scanning optical element included in said imaging means and arrives at said surface to be scanned.

3. A scanning optical apparatus according to claim 1, wherein said ghost light includes light that is reflected from a surface of a scanning optical element included in said imaging means and incident on said deflecting means again and arrives at said surface to be scanned.

4. A scanning optical apparatus according to claim 1, wherein said ghost light includes light that comes from a surface of a chassis supporting scanning optical elements included in said deflecting means and said imaging means and arrives at said surface to be scanned.

5. A scanning optical apparatus according to claim 1, wherein said precedently stored relationship of the position at which ghost light appears and the exposure amount to the light flux emitted from said light source is related to a main scanning direction.

6. A scanning optical apparatus according to claim 1, wherein said precedently stored relationship of the position at which ghost light appears and the exposure amount to the light flux emitted from said light source is related to a main scanning direction and a sub scanning direction.

7. A scanning optical apparatus according to claim 1, wherein a scanning optical element included in said imaging means comprises a plastic lens.

8. A scanning optical apparatus according to claim 1, wherein said light source means comprises a multi-beam light source that emits a plurality of light fluxes that are modulated independently.

9. A scanning optical apparatus in which a plurality of image writing light fluxes that are modulated by different image signals, emitted from plurality of light source means are deflected by deflecting means to opposite directions to scan a plurality of surfaces to be scanned via plurality of imaging means, comprising:

ghost exposure amount calculation means for calculating a position on the surface to be scanned at which ghost light from a component of the scanning optical apparatus disposed in an optical path through which a light flux emitted from said light source means passes appears and an exposure amount thereof, based on precedently stored relationship of the position at which ghost light appears and the exposure amount thereof to the light flux emitted from said light source and on said image signal;

exposure amount control means for controlling an emitted light amount of the light flux emitted from said light source means or a pulse width of the light flux emitted from said light source means based on a result of said calculation.

10. A scanning optical apparatus according to claim 9, wherein said ghost light includes light that is generated by internal surface reflection of a scanning optical element included in said imaging means and arrives at said surface to be scanned.

11. A scanning optical apparatus according to claim 9, wherein said ghost light includes light that is reflected from a surface of a scanning optical element included in said imaging means and incident on said deflecting means again and arrives at said surface to be scanned.

12. A scanning optical apparatus according to claim 9, wherein said ghost light includes light that comes from a surface of a chassis supporting scanning optical elements included in said deflecting means and said imaging means and arrives at said surface to be scanned.

13. A scanning optical apparatus according to claim 9, wherein said precedently stored relationship of the position at which ghost light appears and the exposure amount to the light flux emitted from said light source is related to a main scanning direction.

14. A scanning optical apparatus according to claim 9, wherein said precedently stored relation of the position at which ghost light appears and the exposure amount to the light flux emitted from said light source is related to a main scanning direction and a sub scanning direction.

15. A scanning optical system according to claim 9, wherein a scanning optical element included in said imaging means comprises a plastic lens.

16. A scanning optical apparatus according to claim 9, wherein said light source means comprises a multi-beam light source that emits a plurality of light fluxes that are modulated independently.

17. A scanning optical apparatus according to claim 9, wherein said ghost light includes light reflected from a surface of a scanning optical element included in said imaging means and arriving at an opposite surface to be scanned.

18. An image forming apparatus comprising:
    a scanning optical apparatus according to claim 1;
    a photosensitive member disposed at said surface to be scanned;
    a developing device for developing an electrostatic latent image formed on said photosensitive member by a light flux scanned by said scanning optical apparatus as a toner image;
    a transferring device for transferring said developed toner image onto a transfer destination material; and
    a fixing device for fixing the transferred toner image on the transfer destination material.

19. A color image forming apparatus comprising:
a scanning optical apparatus according to claim 9;
a plurality of photosensitive members disposed at said plurality of surfaces to be scanned;
a plurality of developing devices for developing electrostatic latent images formed on said photosensitive members by light fluxes scanned by said scanning optical apparatus as toner images;
a transferring device for transferring said developed toner images onto a transfer destination material; and
a fixing device for fixing the transferred toner image on the transfer destination material.

20. An image forming apparatus comprising:
a scanning optical apparatus according to claim 1; and
a printer controller that converts code data input from an external device into an image signal and input it to said scanning optical system.

21. A color image forming apparatus comprising:
a scanning optical apparatus according to claim 9; and
a printer controller that converts code data input from an external device into an image signal and input it to said scanning optical system.

\* \* \* \* \*

UNITED STATES PATENT AND TRADEMARK OFFICE
CERTIFICATE OF CORRECTION

PATENT NO. : 7,274,499 B2
APPLICATION NO. : 10/808442
DATED : September 25, 2007
INVENTOR(S) : Manabu Kato It is certified that error appears in the above-identified patent and that said Letters Patent is hereby corrected as shown below:

ON COVER PAGE AT (57) ABSTRACT

Line 7, "on comparison" should read --in comparison--.

COLUMNN 1

Line 9, "an" should read --a--.

COLUMN 2

Line 30, "2001-305459)" should read --2001-305459).--.

COLUMN 3

Line 6, "signal;" should read --signal; and--; and
　　Line 58, "signal;" should read --signal; and--.

COLUMN 5

Line 2, "input" should read --inputs--;
　　Line 9, "input" should read --inputs--;
　　Line 13, "are" should read --is--;
　　Line 23, "cross sectional" should read --cross-sectional--;
　　Line 26, "cross sectional" should read --cross-sectional--;
　　Line 37, "sources where" should read --source, where--;
　　Line 40, "cross sectional" should read --cross-sectional--;
　　Line 43, "cross sectional" should read --cross-sectional--;
　　Line 46, "a" should read --an--; and
　　Line 59, "cross sectional" should read --cross-sectional--.

COLUMN 8

Line 58, "are" should read --is--; and "extend" should read --extends--; and
　　Line 65, "cross sectional" should read --cross-sectional--.

COLUMN 9

Line 41, "the photosensitive" should read --of the photosensitive--.

UNITED STATES PATENT AND TRADEMARK OFFICE
CERTIFICATE OF CORRECTION

PATENT NO. : 7,274,499 B2
APPLICATION NO. : 10/808442
DATED : September 25, 2007
INVENTOR(S) : Manabu Kato It is certified that error appears in the above-identified patent and that said Letters Patent is hereby corrected as shown below:

COLUMN 10

Line 35, "cross sectional" should read --cross-sectional--; and
    Line 38, "cross sectional" should read --cross-sectional--.

COLUMN 12

Line 42, "nor" should read --not--; and
    Line 43, "even ghost" should read --even ghost light--.

COLUMN 13

Line 27, "signal;" should read --signal; and--.

COLUMN 14

Line 13, "signal;" should read --signal; and--.

COLUMN 16

Line 4, "input" should read --inputs--; and
    Line 9, "input" should read --inputs--.

Signed and Sealed this

Eleventh Day of November, 2008

JON W. DUDAS
*Director of the United States Patent and Trademark Office*